June 19, 1928.

W. S. GATTEN 1,674,200

REDUCTION GEARING

Filed June 14, 1927     2 Sheets-Sheet 1

Inventor

William S. Gatten

By Clarence A. O'Brien
Attorney

June 19, 1928.

W. S. GATTEN 1,674,200

REDUCTION GEARING

Filed June 14, 1927    2 Sheets-Sheet 2

*Inventor*
William S. Gatten
By Clarence A. O'Brien
*Attorney*

Patented June 19, 1928.

1,674,200

UNITED STATES PATENT OFFICE.

WILLIAM S. GATTEN, OF OPPORTUNITY, WASHINGTON.

REDUCTION GEARING.

Application filed June 14, 1927. Serial No. 198,750.

My invention relates to speed transmission gearing and has for an object to provide a device of this character of compact construction, thereby permitting the apparatus to be used in a more limited space, as well as reducing the number of parts and material necessary for the construction thereof.

Other objects and advantages reside in the special combination, construction, and arrangement of the various elements forming the invention as more fully hereinafter described and claimed, reference being had to the accompanying drawing, forming part hereof, wherein like numerals refer to like parts throughout, and in which:

Figure 1:
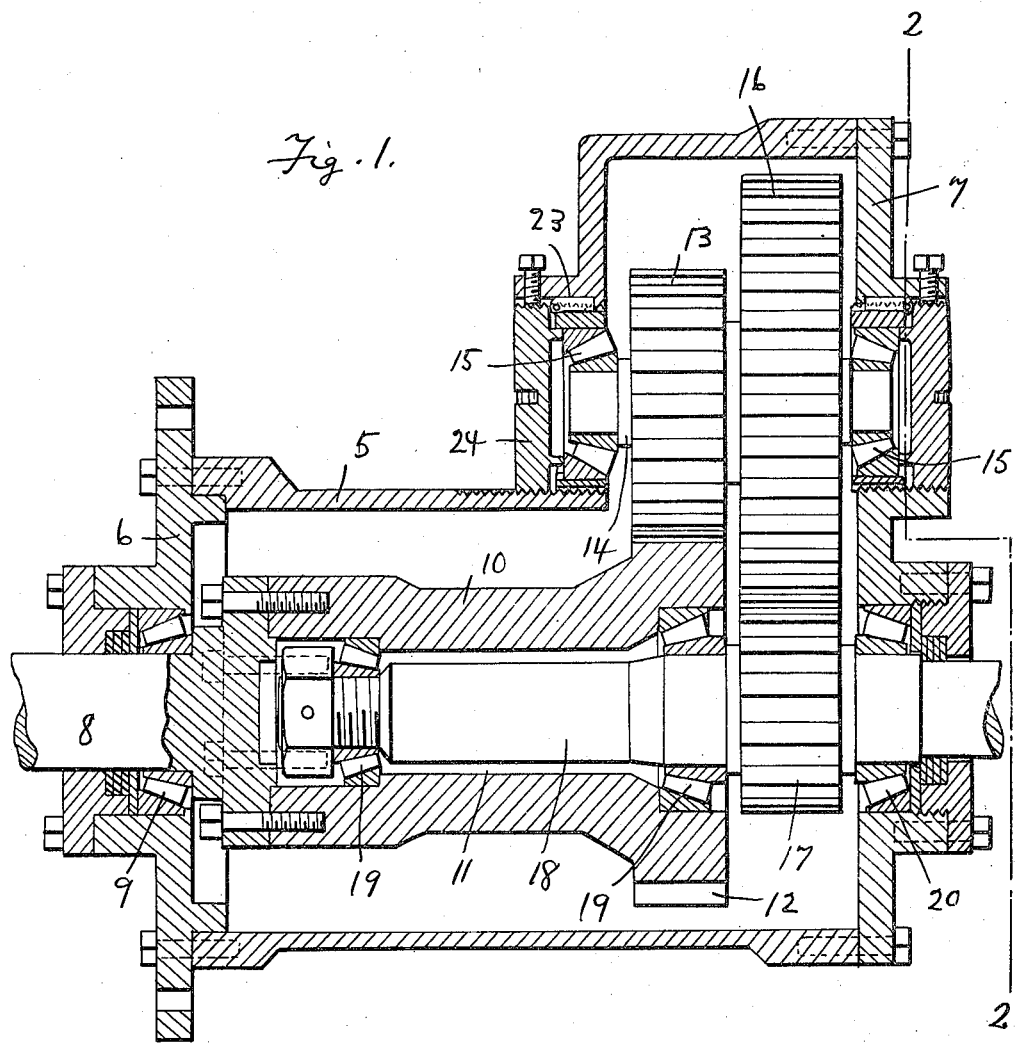
Figure 1 is a vertical sectional view of my gear assembly.
Figure 5:
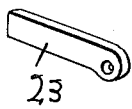
Figure 5 is a perspective view for the lock device for such washer.
Figure 2:
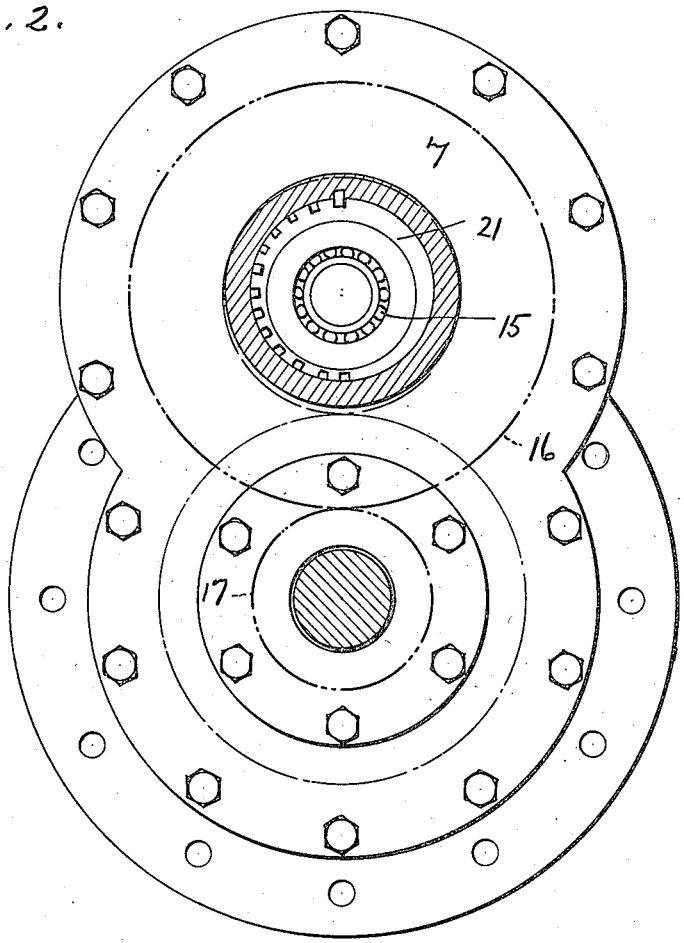
Figure 2 is a sectional view. taken substantially along a line 2—2 of Figure 1.

Referring now to the drawing, I have shown my invention comprising a gear housing indicated generally at 5, and having a lower compartment provided with an end plate 6, and above which is arranged an upper smaller compartment communicating therewith and having an opposite end plate 7, enclosing both of said compartments. A shaft 8 rotatably extends through the plate 6, suitably mounted in bearing 9 and to the inner end of which is secured a hub 10, having a bore 11, formed longitudinally therein. Upon the hub is formed a gear 12, engaging a gear 13 of reduced radius, keyed on a shaft 14, arranged within the upper compartment and suitably supported at each end by bearings 15. A gear 16 is also arranged on the shaft 14, said gear being of an increased radius and adapted to engage a gear 17, formed on a shaft 18, extending through the plate 7, and having its inner end inserted within the bore 11 of the hub and suitably supported, at the inner and outer ends of the bore by bearings 19. Bearings 20 also rotatably support the shaft 18 within the rear plate 7.

Figure 3:
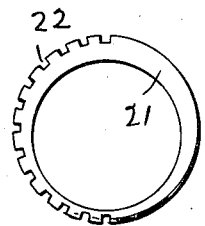
Figures 3 and 4 are details of one of the bearing adjusting washers.
Figure 4:
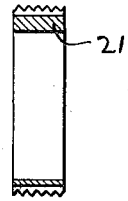

Means for adjusting play in the bearing 15 supporting the shaft 14 within the upper compartment are provided, comprising an eccentrically constructed washer shown by Figures 3 and 4 of the drawings and indicated at 21 and upon one portion of which is arranged a series of notches 22, within which a key 23 is adapted to be inserted. It is thus apparent that as the concentric face of the washer is moved with respect to the bearing, any play therein may be taken up and properly adjusted, and by inserting the key 23 in the proper notch the washer may be held in adjusted position. Locking plugs 24 are provided to prevent accidental displacement of either the keys 23 or the washers 21.

It is obvious from the foregoing that by interposing gears of a suitable ratio, as for instance the gears 13 and 16, between the shaft 8 and 18, the respective speeds of the shaft may be effected.

My invention is susceptible to various changes and modifications in construction thereof, without departing from the spirit of the invention or the scope of the appended claims and I accordingly claim all such forms of the invention to which I am entitled.

I claim:

1. In a device of the character described comprising a shaft having a hub secured thereon, said hub having a bore formed within the same, a gear formed on said hub, a shaft rotatably carried within the bore of said hub, means carried on the shaft co-operating with the bore adapted to retain the same within the hub, a gear formed on said last named shaft, and a train of gearing connecting said hub gear and said shaft gear.

2. In a device of the character described comprising a shaft, a hub having a bore arranged therein secured to said shaft, a gear formed on said hub, a shaft rotatably arranged within said bore, anti-friction means interposed between the shaft and the bore permitting independent rotation thereof, means carried on the inner end of the shaft combining to form an adjustment for said anti-friction means and serving to retain the shaft within the bore, a gear formed on said last named shaft, a counter shaft, adjustable mountings for said counter shaft, and gears formed on said counter shaft and engaging said hub gear and said shaft gear.

3. In combination, a gear housing, shafts extending within the same from opposite sides, a hub secured to the inner end of one of said shafts, said hub having a bore formed therein and adapted to freely receive the end of the other shaft for rotation therein, anti-friction means between the shaft and the bore of the hub, an adjusting nut on the end of said other shaft for said anti-friction means and co-acting therewith to retain the shaft within the bore, a gear arranged on the hub, a counter shaft journaled for rotation in the housing, a gear carried on said other shaft, gears carried on said counter shaft engaging the hub gear and said shaft gear, bearings for the ends of said counter shaft, adjusting washers for the ends thereof, each of said washers comprising an eccentric ring having a plurality of transverse grooves along its eccentric side and supporting the ends of the shaft and adapted through the movement of the washers to adjust the gears on said counter-shaft with respect to the gears on said other shafts and a key insertable in said grooves whereby to lock the washers in adjusted position.

In testimony whereof I affix my signature.

WILLIAM S. GATTEN.